United States Patent [19]

Fortner

[11] Patent Number: 4,872,496

[45] Date of Patent: Oct. 10, 1989

[54] READILY INSTALLED TIRE CLEATS WITH IMPROVED FASTENING MEANS

[76] Inventor: Benjamin A. Fortner, 402 Budleigh Salterton Close, Longwood, Fla. 32779

[21] Appl. No.: 63,578

[22] Filed: Jun. 17, 1987

Related U.S. Application Data

[63] Continuation-in-part of Ser. No. 860,065, May 6, 1985, abandoned, which is a continuation-in-part of Ser. No. 739,921, May 31, 1985, abandoned.

[51] Int. Cl.$^4$ .............................................. B60C 27/20
[52] U.S. Cl. ................................... 152/228; 152/217; 152/225 R; 24/68 CT
[58] Field of Search ........... 152/225 R, 225 C, 213 R, 152/213 A, 217, 218, 219, 226, 227, 228; 301/41 R, 38 R; 403/118, 337, 43, 44, 45, 46, 47, 109; 24/697, 698, 68 TT, 68 CT, 612, 241 SL, 238, 242; 254/231-234

[56] References Cited

U.S. PATENT DOCUMENTS

| | | | |
|---|---|---|---|
| 2,174,345 | 9/1939 | Worthing | 152/213 R |
| 2,576,868 | 11/1951 | Wolf | 152/217 X |
| 2,820,501 | 1/1958 | Heuneman | 152/218 |
| 3,437,121 | 4/1969 | Strapko et al. | 152/225 R |
| 4,529,023 | 7/1985 | Deland | 152/225 R |

Primary Examiner—Michael W. Ball
Assistant Examiner—Gregory J. Wilber
Attorney, Agent, or Firm—Julian C. Renfro

[57] ABSTRACT

An anti-skid device for ready application to a vehicle wheel, that is entirely installable from the outer or hub side of the wheel. A primary embodiment of my device comprises at least three curved cleats, each having an inner surface and an outer surface, and each also having an integral attachment flange having a deliberate bend therein. Each cleat is configured and designed to curve in a cantilever manner around the tread of the tire, and in a primary embodiment, the cleats are interconnected by a number of elongate connection rods. The elongate assembly so formed can be placed around a tire, to encompass substantially more than half of the periphery of the wheel when the cleats are arrayed in an approximately equally spaced relation in contact with the tread of the tire, with the inner surface of each cleat normally disposed in a stand-away relation to the tread of the tire. When the assembly has been tightened around the tire, to place it in its operational mode, the inner surface of each of the cleats is caused to depart from the stand-away relation to the tire tread, and to move into tight contact with the tire tread, thereby creating a form of spring that serves to eliminate any slack tending to form in the assembly due to the tire deforming as a consequence of rolling contact with the ground.

39 Claims, 8 Drawing Sheets

READILY INSTALLED TIRE CLEATS WITH IMPROVED FASTENING MEANS

RELATIONSHIP TO EARLIER INVENTION

This is a Continuation-in-Part based upon my copending Continuation-in-Part application "Readily Installed Cleats for Tire Traction Improvement" filed May 6, 1986, Serial No. 860,065 now abandoned, which was in turn a Continuation-in-Part application based upon my earlier application "Readily Installed Anti-Skid. Tire Cleats", filed May 31, 1985, Serial No. 739,921 now abandoned, and the pertinent teachings of both of these applications are hereby incorporated by reference into this patent application.

BACKGROUND OF THIS INVENTION

Almost every driver living in the temperate zones of the world knows the value of the use of tire chains or other such devices on the wheels of a vehicle when the roads are either icy or covered with snow. However, the installation of tire chains has traditionally been such an ordeal that many drivers prefer either to "take their chances", or else to resort to the rather small, traction increasing devices that are strapped around the tire at two or so locations. These latter devices cannot be used, however, in instances in which solid wheels are involved, for these latter devices have straps that must be threaded through the face of the wheel in order to attach these anti-skid devices.

Snow tires are very popular with a large segment of the driving public, but there are times that snow tires do not suffice, such as in very heavy snow, or when the roads are icy. Although tire chains are indispensable in these latter instances, most drivers postpone the installation of tire chains until they are already threatened with the problem of an immobilized vehicle, but by that time the vehicle may be so near a snowbank or a curb as to greatly complicate the installation of the tire chains.

A careful consideration of the prior art devices reveals that the previous patentees failed to compensate for changes of tire configuration during dynamic conditions, when the vehicle utilizing the tires was underway on snow or ice. More particularly, each portion of a tire at a given moment necessarily becomes wider or bulges during the brief instant of time that it is in contact with the ground. Moreover, there is a definite foreshortening of the radius of the tire at the location between the center of rotation of the wheel, and the point of ground contact. The foreshortening of tires during dynamic conditions is recognized in several publications, and as an example, foreshortening as noted by Firestone Tire and Rubber Company in one of their publications may be reproduced as follows:

| Tire Size Designation | Overall Diameter (inches) | Static Loaded Radius |
|---|---|---|
| P155/80R13 | 22.76 | 10.15 |
| P165/80R13 | 23.39 | 10.39 |
| P175/70R13 | 22.68 | 10.12 |
| P175/80R13 | 24.02 | 10.62 |
| P185/70R13 | 23.23 | 10.33 |
| P185/80R13 | 24.65 | 10.86 |
| P175/75R14 | 24.33 | 10.86 |
| P185/70R14 | 24.25 | 10.83 |
| P185/75R14 | 24.96 | 11.10 |
| P195/70R14 | 24.80 | 11.04 |
| P195/75R14 | 25.51 | 11.31 |
| P205/75R14 | 26.14 | 11.54 |
| P215/75R14 | 26.69 | 11.75 |
| P205/75R15 | 27.13 | 12.04 |
| P215/75R15 | 27.68 | 12.24 |
| P225/75R15 | 28.31 | 12.48 |
| P235/75R15 | 28.86 | 12.69 |

There is a difference between the static loaded radius and the dynamically loaded radius, but that distinction is not of particular consequence to my invention.

By selecting for a particular tire, the overall diameter, and by adding to one half of that value, the static loaded radius selected from the table for that particular tire, one is able to ascertain what the loaded height is for that tire under conditions of average, normal conditions. Then, by subtracting the loaded height from the overall dimension (diameter) of the tire at a location 90 degrees away from the ground contact location, the extent of the foreshortening can be determined.

This type of calculation is of particular consequence in a tire equipped with an anti-skid device of the prior art having only two points of contact with the tire tread, such as the Heuneman Pat. No. 2,820,501. It is to be realized that the foreshortening of the tire when one of such tire cleats is in contact with the ground may well mean that the cleat located at the opposite side of the tread may well be dislodged from proper contact, and be flung off the wheel.

A two point of contact device utilizing the rim as a connection point would be dislodged due to the sidewall bulging of the tire at the point of ground contact, therefore precluding this type of device as a satisfactory solution to the problem of designing an easily attached, highly satisfactory anti-skid device.

Some patentees have sought to overcome such disadvantages by utilizing an anti-skid device having more than two points of tire contact. Although the Worthing Pat. No. 2,174,345 teaching an anti-skid device having three points of tire contact would probably not be flung off as readily, it nevertheless fails to take into consideration the fact that some type of compensation for the changes of tire configuration during dynamic conditions must be made. More particularly, inasmuch as Worthing does not create a substantially rigid plane alongside the tire, the cleat portions of the tire can gradually work loose during driving conditions, with the result that the Worthing device will also be flung off, and the patentee's statements to the effect that tensioning of the device to be supported by the tire only are to no avail. This is because the bulging of the tire coupled with the foreshortening of the tire, as shown by the tire loaded height, will cause the tension plane to relax, and the Worthing device to become disconnected and fall off.

The Strapko et al Pat. No. 3,437,121 clearly does not compensate for tire dynamics, at which time the tire foreshortens, so nothing therefore prevents a constant flexing of his device from taking place. Unfortunately in the case of that patentee's device, the turnbuckle utilized in his FIG. 2 may easily loosen during this flexure, and likewise there is nothing to prevent the alternative latching means illustrated in Strapko's FIG. 4 from loosening and permitting his traction device to entirely fall off. It is to be realized that the equivalent of both of these systems was tested by the present inventor, and both were found inadequate.

In effect Worthing and certain other patentees fail to recognize the need for their tire engaging members to flex in a closely controlled manner during dynamic conditions, while being supported from a substantially rigid plane located parallel to the tire, and closely adjacent thereto.

The Deland Pat. No. 4,529,023 apparently overcame the distinct disadvantages of the Worthing device by using a central, rigidly affixed pivotal support member that ostensibly created a rigid plane by the use of an apparently satisfactory tightening device. Unfortunately, the apparent advantages of the Deland device may not be realized in a dynamic circumstance, for each time one of his tread-contacting members comes in contact with the ground, the tire necessarily foreshortens, and serves to loosen the rigid plane the patentee was seeking to establish. In other words, Deland's device did not teach any compensation for the foreshortening that must occur when a tire is exposed to dynamic condition, and if Deland endeavored by his design to clamp the tire engaging members so tightly during the installation procedure as to avoid undesirable loosening, it would require either a person of enormous strength, or else a piece of power equipment in order to accomplish the requisite tightening of the flexible linkages that would bring about the extremely tight gripping of the tire that was needed.

It is for reasons such as these that I was inspired to evolve the present, readily installed anti-skid device, featuring a rigid plane adjacent the tire, upon which are mounted anti-skid cleats for gripping the tire tread in at least three locations, with my highly advantageous arrangement automatically accomplishing the needed compensation for the foreshortening of the tire that necessarily occurs during dynamic conditions of tire use on a vehicle.

SUMMARY OF THE INVENTION

In accordance with this invention I have evolved an anti-skid device that can be readily installed upon, and readily removed from, the driven tire of a vehicle wheel so that its traction can be temporarily increased.

Advantageously, my device is installable from the outer or hub side of the wheel, with access to the backside of the tire or the underside of the vehicle being entirely unnecessary. My novel device comprises at least three curved cleats, each having an inner surface and an outer, road-contacting surface, and each also having an integral attachment flange. Each of these cleats is configured and designed to curve in a cantilever manner around the tread of the tire, with the inner surface of each cleat disposed adjacent the tread and both sidewalls of the tire, so that on installation, each cleat of my novel anti-skid device can be caused to tightly clasp the tread and outboard portions of the sidewalls of the tire.

The several cleats of my anti-skid device are mounted upon and interconnected by a rigid framework, such as may be constituted in a preferred embodiment of my invention by a plurality of elongate connection rods, with there being as many connection rods as there are cleats, and with all but one of the connection rods being of fixed length. Each end of each connection rod is pivotally affixed to the integral attachment flange of a cleat, thus forming an elongate assembly that can be installed by placing it along the periphery of the tire, working either from the front or rear of the driven wheel, to encompass approximately two thirds of the periphery of the tire when the cleats are arrayed in an approximately equally spaced relationship, in contact with the tread of the tire. Importantly, the attachment flanges of the three or more cleats are deliberately angled or bent so as to cause a highly advantageous form of internal spring to be created when the assembly is properly and tightly installed on the tire of a driven wheel.

With regard to the remaining connection rod, which is not of fixed length, this device is made in two pieces, with one end of each of these pieces being connected to the attachment flange of a cleat, with interconnection means being utilized such that the other ends of these two pieces can be drawn tightly together and latched in a manner to create a connection rod approximately the same length as the connection rods of fixed length. By the interconnecting of the aforementioned separate pieces, the establishment of the anti-skid assembly in surrounding relation around a driven tire can be readily completed, such that the inner surfaces of each of these cleats can be brought into tight contact with the tread of the tire, as well as into contact with portions of the inner and outer sidewalls. The novel spring action inherent in my design is brought into play at the time the interconnection means is closed and latched.

As is obvious, the type of interconnection means that is utilized can take different forms, and the cleats can be of selected sizes. It is desirable for the tires of a given vehicle to be noted at the time of purchase of one of my anti-skid devices, such that the cleats will be of a size appropriate for such tires, and so that the connection rods will be of a length such that my device can be tightly and properly installed upon the vehicle wheel.

As previously mentioned, my device is installed only from the outer or hub side of the vehicle wheel, which means that my device could be installed at the time a vehicle is to be driven up a driveway and through an unplowed strip of road to the highway, and thereafter quickly removed when my anti-skid device is no longer required for increased road traction.

I am aware that other quickly installed anti-skid devices are being marketed that are manufactured in Europe, but it is important to note that such devices are conspicuously labeled "Do not exceed 10 miles per hour" and bear a statement to the effect that they are "not designed for long-term driving or for use on a snowfree, hard surface road". This of course means that those devices are clearly of limited value. Importantly, the European device often requires hub cap removal for its accommodation, whereas mine normally does not.

It is therefore to be realized that at the time a given cleat is caused by tire rotation to make contact with the ground, and the tire at that location to foreshorten due to the weight of the vehicle, the inherent spring action of the remaining cleats of my novel device, which are cantilevered in a cocked relationship to the rigid mounting plane, advantageously serve to compensate for the dynamics of the tire and essentially eliminate any slack that would otherwise be created, thus entirely preventing my device from being flung off when the vehicle so equipped has gotten underway.

This automatic compensation for tire foreshortening in accordance with my invention, in conjunction with a telescoping bar interconnection with integral tightening bolt that I preferably use as the fastening means, provide an anti-skid device of substantial structural integrity, that is capable of many miles of effective use by the motorist.

A principal object of my invention is therefore to provide an anti-skid device of light weight and low cost, that can be quickly installed from the outer or hub side of a vehicle wheel, even by a youth or a woman, with access to the backside of the tire or the underside of the vehicle being completely unnecessary for either installation or removal.

It is another important object of my invention to provide an easily installed anti-skid device for each driven wheel of a vehicle that involves a rigid frame having at least three curved cleats in contact with the tread of the tire, wherein essentially all flexure of the device to accommodate changes of tire configuration during dynamic conditions is confined to the cleat portions of the device that are in contact with the tire tread, which flex so as automatically to eliminate slack.

It is another important object of my device to provide an easily installed anti-skid device for use on the wheel of a vehicle, in which a framework parallel to the plane of the tire is created, to the corners of which framework, cantilevered cleat members designed to contact the tread of the tire are pivotally attached, with portions of such cleats being capable of being spring loaded during the installation procedure, such that flexure of the tire during dynamic conditions will be absorbed by the cleats in such a way as to prevent fling off.

It is yet another important object of my device to provide an easily installed anti-skid device for use on the wheel of a vehicle, in which an essentially rigid framework parallel to the plane of the tire is created, to the corners of which framework, cleat members designed to contact the tread of the tire are pivotally attached, with essentially all flexure of the device to accommodate changes of tire configuration during dynamic conditions largely being confined to the out-of-ground-contact cleats, which are permitted to flex in a closely controlled, springlike manner, so as to assure a tight gripping of the tire during dynamic conditions.

It is another object of my invention to provide an anti-skid device of simple and inexpensive construction, that when installed on a driven vehicle wheel, will permit the vehicle to be driven at speeds comparable to those attainable when using tire chains, i.e., 20 mph, and of intermediate or medium duration highway usage, therefore satisfying the need for achieving safe driving conditions for the greatest majority of vehicles being driven on snowy or icy roads.

It is still another object of my invention to provide a low cost anti-skid device utilizing novel, tire gripping cleats that are quickly installable on a vehicle tire, that grip the tire very tightly during dynamic conditions of road use, and that may be removed easily and quickly at the time appropriate to do so, and stored in a small volume.

It is yet still another object of my invention to provide an anti-skid device that, when installed on a tire, is designed to develop a highly effective internal spring action, causing it to grip the tire in a very tight and highly satisfactory manner.

It is yet still another object of my invention to provide an anti-skid device having a quickly operated interconnection means possessesing substantial structural integrity, achieved by the use of a bar of square cross-section, arranged to interconnect in a telescoping relationship with a section of tubing of square cross section, thus effectively preventing any undesirable twisting of the interconnection means.

It is still another object of my invention to provide a lightweight anti-skid device that can be quickly installed on a vehicle wheel by a person not possessing great strength, usually without necessitating hub cap removal.

These and other objects, features and advantages will be more apparent as the description proceeds.

DETAILED DESCRIPTION

Figure 1:
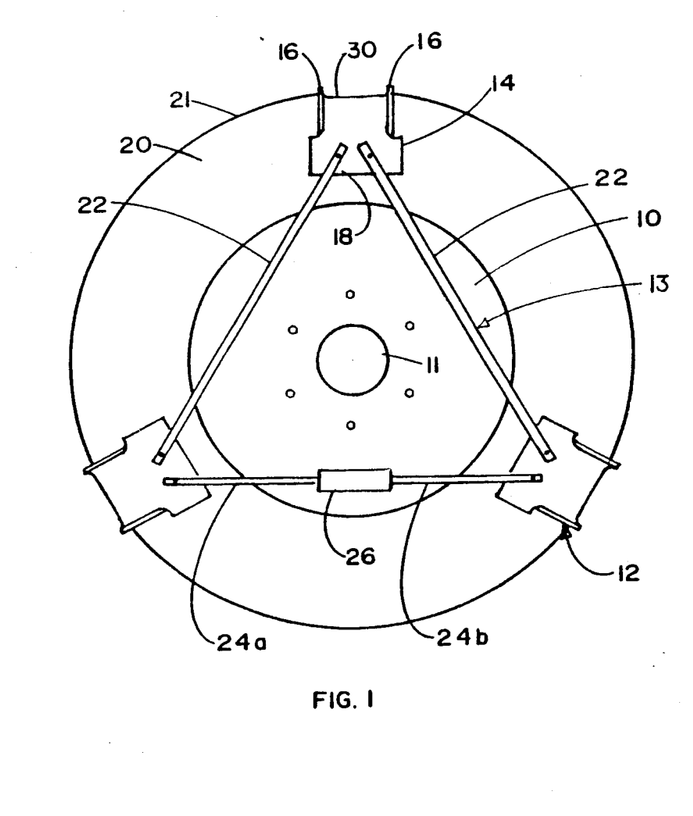
FIG. 1 is a side elevational view of my novel anti-skid device, shown in the installed position on the wheel of a vehicle, with the interconnection means located below the wheel hub, and with no member crossing the hub area of the wheel.

Turning to FIG. 1, it will there be seen that I have illustrated a vehicle wheel 10 upon which an anti-skid device 12 in accordance with this invention has been installed. Quite advantageously, my device 12 is entirely installable from the outer side of the wheel 10, tat is, from the side clearly visible in FIG. 1, which is the same side of the wheel upon which the hub 11 and the wheel lugs are located.

My device utilizes a rigid framework 13 adapted to be placed parallel to the tire 20 mounted upon the wheel 10, and located against the outer sidewall of the tire. Although the rigid framework I utilize may be created in accordance with various embodiments of this invention, in a preferred embodiment I utilize a rigid framework made up of a plurality of connection rods, such as a pair of connection rods 22 of fixed length, that are used in conjunction with a third connection rod made up of separate components 24a and 24b. As will be seen hereinafter, the connection rod components are tightened at the time of installation by the use of a member 26 serving as the connecting and tightening means, otherwise known as the interconnection means, which member 26 may be selected from state of the art devices, several of which are described and illustrated herein.

Figure 2:
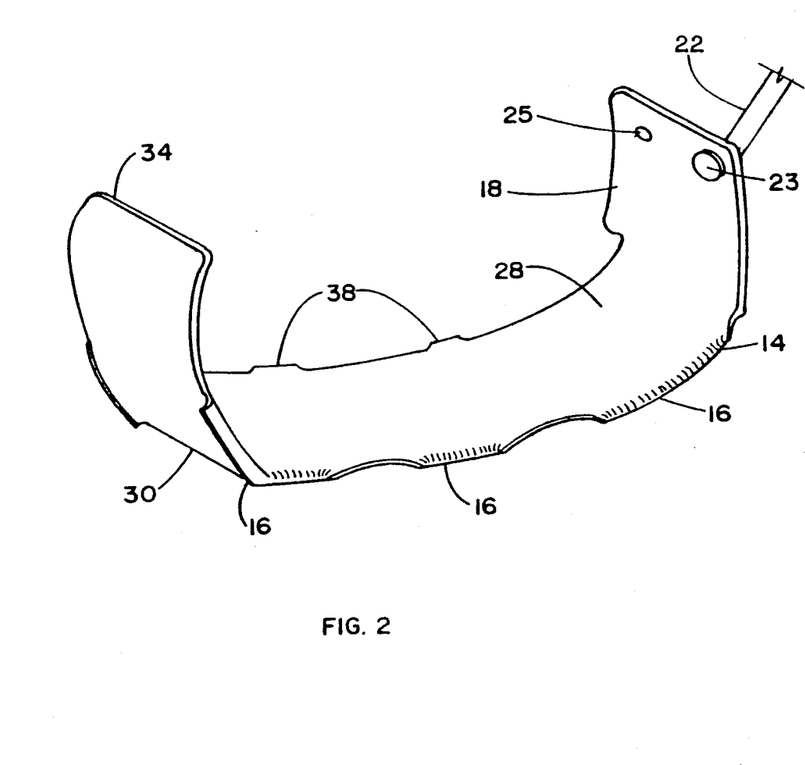
FIG. 2 is a perspective view to a somewhat larger scale, of one of the novel curved anti-skid cleats of the type utilized by my device.

I prefer to use in conjunction with my device, a plurality of rigid metal cleats 14, one of which is shown in FIG. 2, with each cleat having an inner surface 28 adapted to contact the tread of a tire, an outer surface 30 adapted to contact the road, and an integral attachment flange 18, to which a pair of connection rods are attached. A bend is deliberately created in the integral attachment flange 18 for a reason soon to be discussed.

Figure 4:
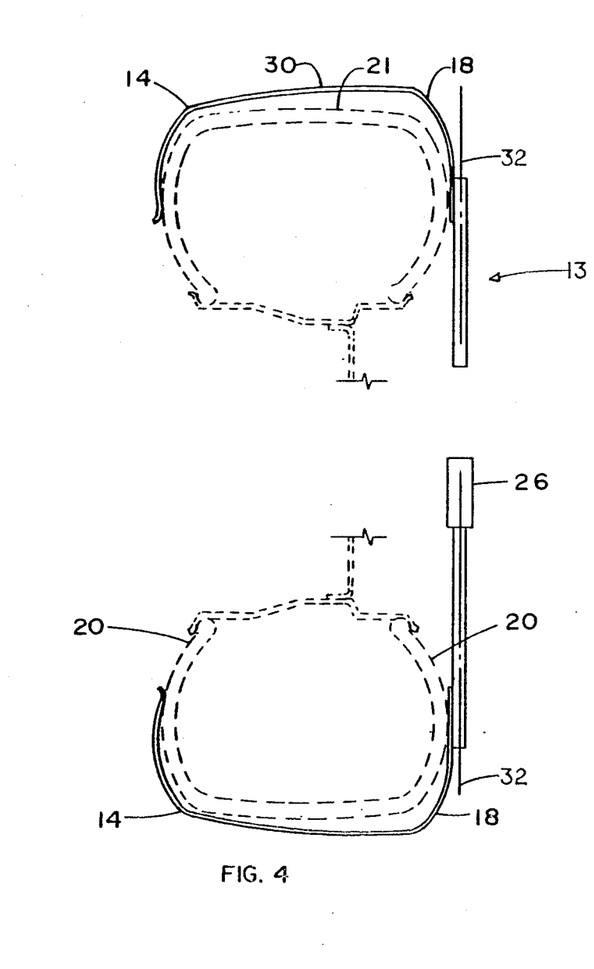
FIG. 4 is a cross sectional view taken approximately at the midpoint of a vehicle wheel, showing how my cleats normally stand away from the tread of the tire before the attachment means are tightened.
Figure 5:
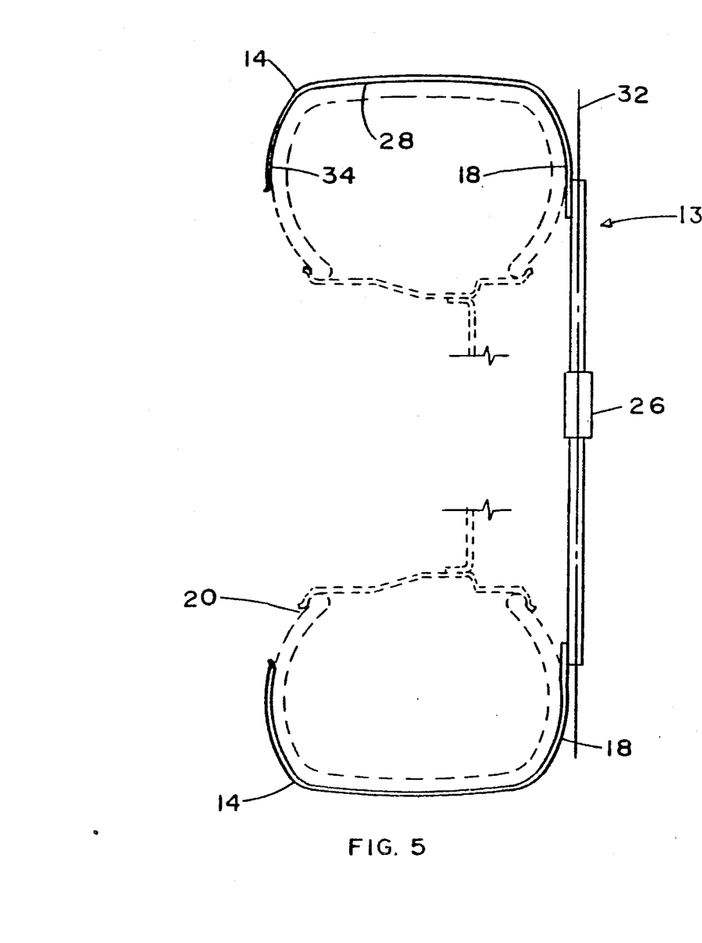
FIG. 5 is a cross sectional view similar to FIG. 4, but showing how the tightening of the attachment means causes a tension plane or rigid framework to be established, causing the curved cleats to tightly grip the tread and radially outward or outboard portions of the sidewalls of the tire.

As will be seen in greater detail hereinafter, the plurality of curved cleats are each designed to curve in a cantilever manner around the tread 21 as well as outboard parts of the inner and outer sidewalls of the tire at the time of installation, and as shown in FIG. 4, the inner surfaces 28 of the cleats are not at right angles to the plane of the rigid framework 13, but rather bend toward the axis of rotation of the vehicle wheel. In other words, the cleats illustrated in FIG. 4 have less than a 90° angle with respect to the plane of the rigid framework 13, due to the bend created in the integral attachment flange 18. This curvature used in the attachment flange of the several cleats results in a form of inherent spring action that is highly advantageous, in that when the connecting and tightening means 26 is tightened during the installation procedure, the inner surfaces of the cleats are caused to move into approximately a right angle relationship with the rigid framework, as depicted in FIG. 5, with the result that the plurality of cleats grip the tread as well as outboard portions of the inner and outer sidewalls of the tire very tightly. Because of this highly advantageous spring action, the cleats continue to grip the tire very tightly, even under severe dynamic driving conditions, and as a result, the possibility of my anti-skid device being flung off at reasonable vehicle speeds is substantially eliminated.

Preferably my device comprises the use of at least three curved tire-engaging cleats 14, which are to be installed at equal intervals around the tread of the tire. The use of three cleats is illustrated in FIG. 1, but it is to be understood that a larger number of cleats can be utilized if necessary, such as on larger diameter wheels. As previously mentioned, each cleat has a curved inner surface 28 which, as shown in FIG. 2, is adapted to be brought into direct contact with the tread 21 and radially outward sidewall portions of the tire 20, at the time my device is tightened onto the wheel. Because the cleats also have an outer, road contacting surface 30 which contains upstanding anti-skid flanges 16 or other such protrusions, my cleats are adapted to grip a surface of snow or ice in a highly effective manner, as will be discussed hereinafter.

As previously noted in FIG. 1, in the preferred embodiment of my invention, the cleats 14 are interconnected by a rigid framework 13 made up of a number of elongate connection rods 22 of fixed length, as well as a connection rod made up of two separate pieces or components 24a and 24b. In every instance I use as many connection rods as there are cleats 14, and as will be made clear hereinafter, the use of the two piece connection rod 24a, 24b makes possible the ready assembly of my lightweight anti-skid device onto a wheel, as well as the ready removal of the device therefrom. Typically the two piece connection rod is in the position directly below the hub 11 of the wheel, as depicted in FIG. 1, at the time of installation or removal of my anti-skid device. Several different embodiments of connection and tightening means (interconnection means) 26 by which the connection rod components 24a and 24b are held tightly together will be hereinafter discussed.

I am not limited to any particular length of connection rod, but for convenience I typically choose the connection rod length such that the location of the interconnection member 26, which for example may be a turnbuckle, is caused to be disposed in a relatively clear area between the wheel hub and the tire rim. This will of course result in the installer having as much clearance as possible for the manipulation of the turnbuckle (or other suitable device) in the tightening direction at the time of installation of my device on the wheel. Although the pins or rivets by which the ends of the connection rods are affixed to the integral attachment flanges 18 of the cleats are some two inches radially outwardly of the tire rim, because of the geometry of the configuration I prefer to use, the turnbuckle or other interconnecting and tightening means 26 will be located radially inwardly of the tire rim, as revealed in FIG. 1.

It is important to note from FIG. 1 that a generally triangular configuration exists when a three cleat embodiment of my fixed frame device has been installed on a vehicle wheel, with the hub area of the wheel left clear. Similarly, a square or hexagonal configuration is created when a four cleat or six cleat embodiment is utilized. As a result of this important feature, hub cap removal is seldom if ever necessary in the use of my device.

I prefer to construct each cleat, such as the cleat illustrated in FIG. 2, of hardened spring steel, such as 1074, 1070 or 4130 steel, with each cleat being configured and designed to curve in a cantilever manner around the tread as well as outboard portions of the sidewalls of the tire. The upstanding anti-skid flanges 16 are formed on the outer or road contacting surface 30 of each of the cleats prior to the step of hardening the steel, with these flanges extending along either side of the cleat so as to be in an optimum position for engaging a snowy or icy road surface in an anti-skid manner.

With regard to the bent integral attachment flange 18 to which the ends of the adjacent connection rods 22 are attached by means of attachment pins 23 welded to each elongate connection rod, it is to be noted that each pin 23 is rotatable in its respective hole in the attachment flange 18, so that the connection rods are readily movable with respect to the cleat(s) to which they are attached. In some instances I may utilize a single pin of greater length to secure a pair of the connection rods to the attachment flange, but this is not the preferred arrangement.

With continuing reference to FIG. 2, it will be seen that in addition to revealing the inner surface 28 of a cleat 14, this view also reveals additional details of the anti-skid flanges 16, the interruptions or lateral anti-skid notches 38 between adjacent anti-skid flanges, and the manner in which the end of a connection rod 22 is pivotally secured by an attachment pin 23 near one edge of the angled flange 18. Hole 25 is provided to receive the pin 23 of the other connection rod 22, thus amounting to the utilization of independent mounting points. Also revealed in this figure is interior flange 34 of the cleat, which is designed to clasp the inner (rear) sidewall of the tire, which of course is on the opposite side of the wheel from the hub of the wheel.

Figure 3:
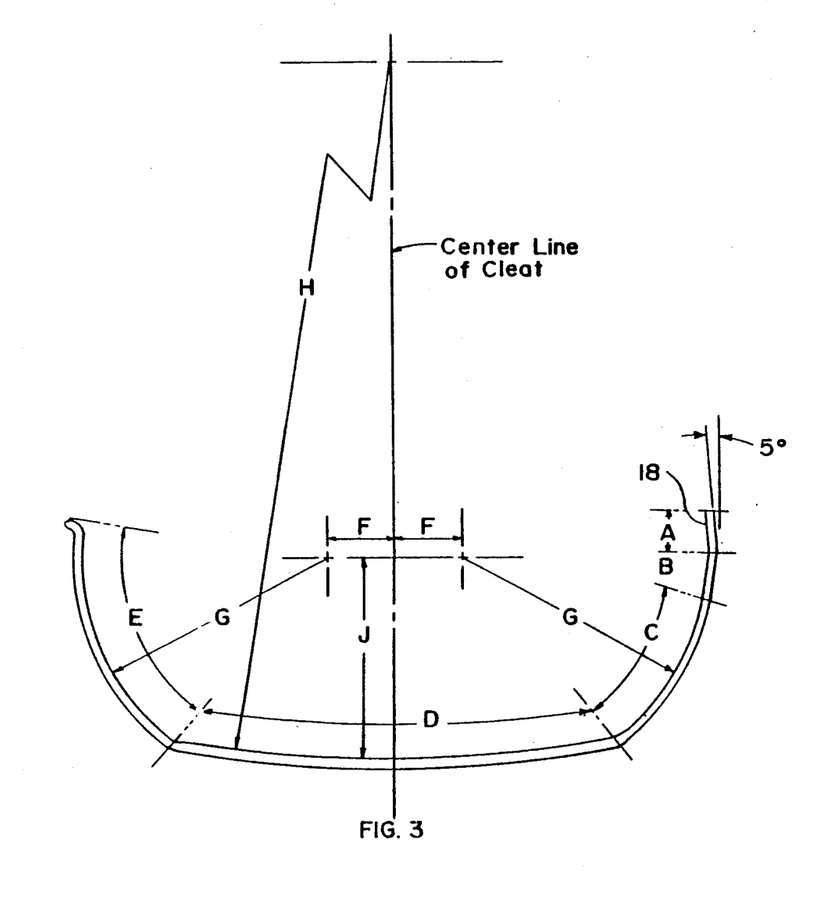
FIG. 3 is a cross sectional view taken through a cleat of somewhat simplified form, with this view utilizing symbols that are relatable to specific cleat dimensions associated with various tire sizes.

Turning to FIG. 3, it is to be seen that the anti-skid flanges have been removed from this exemplary cleat in the interests of minimizing confusion. From the reference letters disposed on the cleat 14, it is to be seen that the cleats can be individualized for use with different Series 70, 75 and 80 tires, as follows:

| Radial Tire Size | Selected length measurements around periphery in inches | | | | |
|---|---|---|---|---|---|
| | A | B | C | D | E |
| 155 | 1.15 | .76 | 1.44 | 4.60 | 3.30 |
| 165 | 1.03 | .75 | 1.81 | 4.80 | 3.51 |
| 175 | 1.06 | .78 | 1.90 | 5.20 | 3.66 |
| 185 | 1.20 | .80 | 1.88 | 5.50 | 3.77 |
| 195 | 1.25 | .84 | 1.97 | 5.80 | 3.89 |
| 205 | 1.38 | .58 | 2.25 | 6.20 | 4.04 |
| 215 | 1.52 | .62 | 2.52 | 6.40 | 4.44 |

It is to be noted that the foregoing measurements are between tangent points, except for the beginning point of length A, and the terminus of length E.

Other significant measurements of these selected cleats as illustrated in FIG. 3 are as follows:

| Radial Tire size | Spacing of radius points from centerline F | Sidewall radii G | Tread radius H | Spacing of radius points from tread J |
|---|---|---|---|---|
| 155 | .25 | 2.84 | 11.25 | 2.20 |
| 165 | .45 | 2.80 | 11.25 | 2.30 |
| 175 | .57 | 2.92 | 11.25 | 2.45 |
| 185 | .62 | 3.00 | 11.25 | 2.50 |
| 195 | .74 | 3.12 | 11.25 | 2.62 |
| 205 | .73 | 3.27 | 11.25 | 2.70 |
| 215 | .75 | 3.50 | 11.25 | 2.96 |

The elongate connecting rods 22 as shown for a three cleat system, are individualized for use with different wheel rim diameters as follows:

| Wheel Size in Inches | Rod Length in Inches |
|---|---|
| 13 | 15.2 |
| 14 | 16.1 |
| 15 | 16.9 |

It is to be realized that one cleat is disposed directly opposite another, that is, residing in diametrically opposed positions with respect to the hub 11 of the wheel, only when four or six of my novel spring steel cleats are utilized on an anti-skid device in accordance with this invention. This is the type of arrangement illustrated in FIGS. 4 and 5, and as a result of this inward angling of the cleats, the tire is caused to be gripped tightly at such time as the interconnection means is closed.

It should now be abundantly clear that the relationship of each cleat's integral attachment flange with respect to the plane of the connection rods 22 is such as to cause the cleats 14 to initially stand away from the tread 21 of the tire 20. More specifically, the road contacting portion 30 of each cleat is to be seen in FIG. 4 to normally reside at an angle of approximately 5° to the tread of the tire (which of course is less than 90° with respect to the plane of the framework 13) at such time as the inner surface of the cleats have been placed in light contact with the tire tread, when the interconnection components 26 are in the attachment mode, and not yet fastened. In an even more specific manner, FIG. 3 calls out this 5° angle of the integral attachment flange with respect to the illustrated Center Line of Cleat.

When the connecting and tightening means 26 has drawn the anti-skid cleats 14 into the operating mode, when they make tight contact with the tread and outboard portions of the tire sidewalls, the relationship becomes that as illustrated in FIG. 5, with the rigid framework 13 created out of the connection rods 22 defining a tension plane 32.

Figure 6:
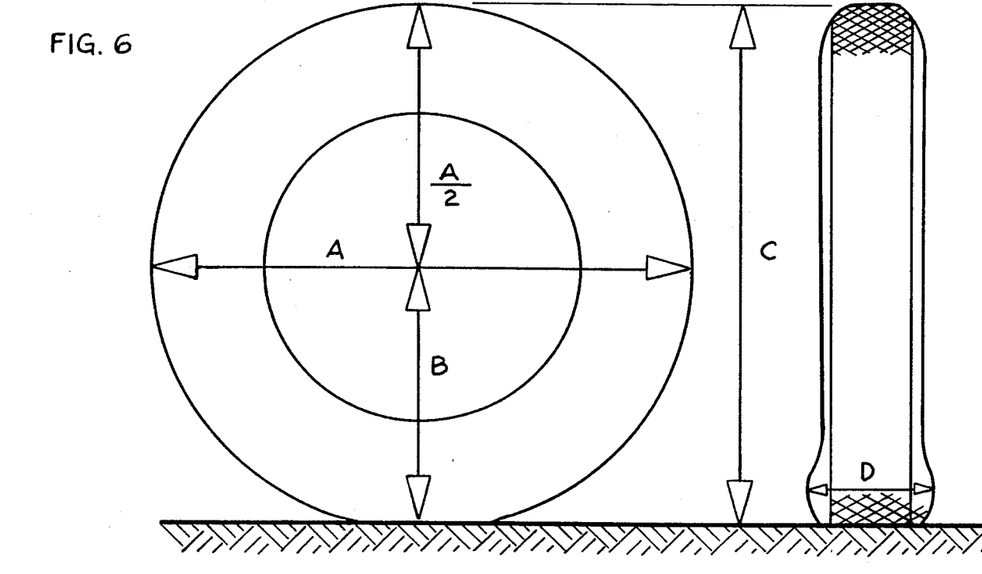
FIG. 6 is a schematic view of a tire, showing the bulging of the tire at the point of ground contact, and certain designations or dimensions referenced hereinafter in the text.

To a considerable degree the success of my invention is attributable to a recognition of the fact that when a pneumatic tire is installed on a vehicle in a load supporting relationship, its vertical height changes in that the lower part of the tire, that is, the part in contact with the road, will bulge as indicated that D in FIG. 6. The overall tire diameter A remains constant in the horizontal direction, that is, in a left-right sense, and the radius of the tire above the hub is A/2, but the loaded radius (preferably regarded as the static loaded radius) is represented by B in FIG. 6, which of course is a lesser dimension than the radius at an unloaded location. From this it can be readily seen that the vertical dimension C of this tire is equal to A/2+B, due to the foreshortening of the tire due to it bearing a portion of the vehicle's weight.

Because the anti-skid devices of the prior art did not take the bulging of the tire at the road contacting location and foreshortening of the wheel into consideration, those earlier devices were often flung off, even at comparatively low speeds.

As previously indicated, a type of spring action is created by the cleats of my invention being attached at a noticeable angular relationship to the framework 13, which angular relationship is substantially eliminated in the static wheel at the time the connection rod portions are joined together and tightened by the tightening means. When the vehicle is underway, however, the road-contacting portion of the tire is caused to bulge and the lower tire radius to foreshorten at the time a given cleat is in the lowermost position. A certain amount of deformation must take place in my device at such time, but the spring loaded condition existing at the other two cleats advantageously manifests itself so as to eliminate the slack that would otherwise exist and that would invite flingoff.

In other words, because of the highly successful inherent spring action involved in my novel design, at such time as the radius from the road to the wheel hub diminishes, the other cleats move to eliminate the slack that otherwise would have occurred had there not been the angularity the tire contacting portions of the cleat bear to a plane perpendicular to the plane of the framework 13. Thus, the angularity deliberately created in the integral attachment flange 18 of each cleat in accordance with my invention amounts to a very effective and automatically functioning device serving to assure the tight gripping of the tread of the tire during all phases of use.

Figures 7, 7A:
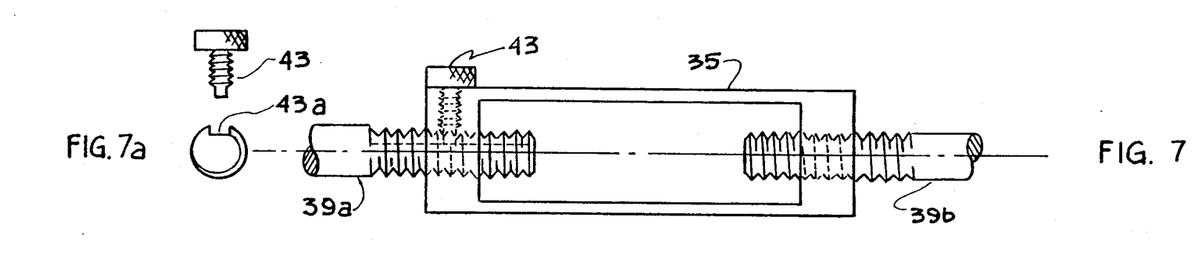
FIG. 7 is a view revealing the usage of a turnbuckle as the interconnection and tightening means.
FIG. 7a is a fragmentary view of a preferred form of locking means for preventing undesired loosening of the turnbuckle.

Turning to FIG. 7, I therein illustrate a turnbuckle 35 of the type that has proven satisfactory, and in this instance, a right handed thread is formed on the end of one connection rod, and a left handed thread is formed on the end of the other connection rod, with the result being that when the principal turnbuckle member is tightened, the connection rod portions 39a and 39b are brought more tightly together, thus causing the inner surfaces of each of the cleats to grip the tread and outboard tire sidewall portions to a desirable degree of tightness. As will be noted, a knurled lock screw 43 is preferably utilized to prevent an undesired loosening of the turnbuckle when my anti-skid device is in use on the road. It is desirable that the unthreaded lower portion of the lock screw 43 be received in a notch 43a extending parallel to the longitudinal axis of the portion 39a at such time as the screw has been tightened; note FIG. 7a.

Figure 8:
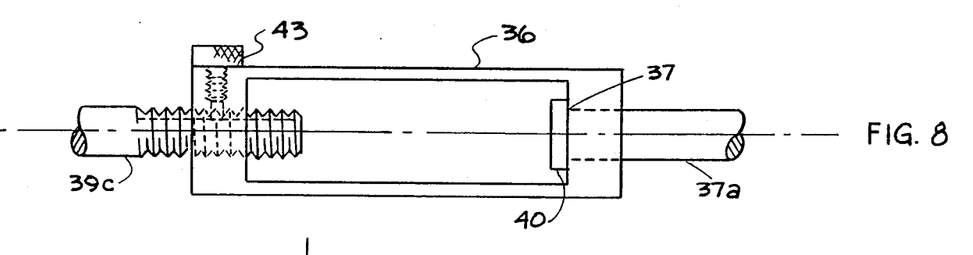
FIG. 8 is a preferred form of turnbuckle in that the principal member is captive on one of the connection rod ends, and therefore not subject to loss.

With reference to FIG. 8, I there illustrate a single ended turnbuckle 36, one that requires only one of the two connection rod ends to be threaded; see rod 39c. A rotary joint 37 is formed on the other connection rod, with respect to the enlarged head member 40 of which the principal turnbuckle member is rotatable. I prefer this type of interconnection means inasmuch as the turnbuckle member 36 will be kept captive and cannot become lost. Another advantage is associated with the fact that it is easier to utilize this type of connecting and tightening means inasmuch as the turnbuckle member 36 can slide for a limited distance along the unthreaded member 37a with respect to the head member 40 of the rotary joint at the time the installation procedure is being commenced.

In the preferred embodiment, I utilize a double lead screw, which minimizes the number of revolutions of the turnbuckle needed to achieve a desired degree of tightness of the cleats around the tire tread. As in the preceeding figure, I prefer to use a lock screw 43 in the device of FIG. 8 also, the use of which lock screw enables me to avoid a possible undesired loosening of the turnbuckle.

Figure 9A:
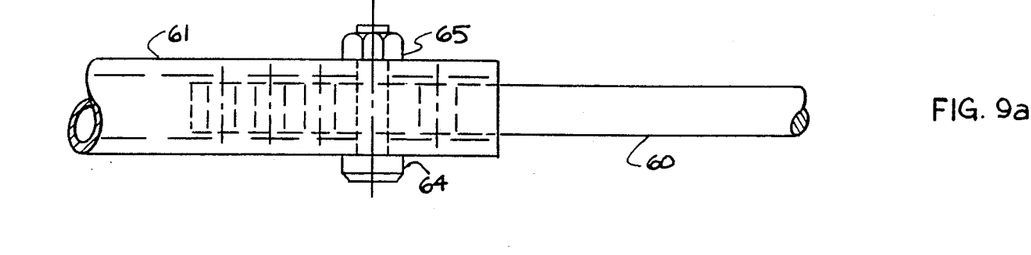
FIGS. 9a and 9b are showings of the use of another form of interconnection means.
Figure 9B:
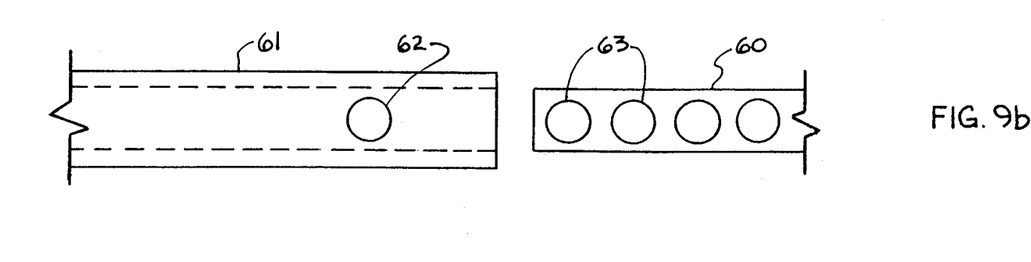

Turning now to FIGS. 9a and 9b, I have here illustrated an embodiment in which one of the connection rod members is in the form of a rod 60, and the other connection rod members is in the form of a tube 61, with this tube having a central hole 62 designed to closely accept the rod at the time joining is desired. A series of evenly spaced holes 63 is located in the rod member, so that at the time of installation, the user inserts the rod into the tube to the position corresponding to a desired degree of tightness, after which a bolt 64 is inserted through aligned holes in members 60 and 61. A nut 65 is then tightened on the end of the bolt 64 so as to prevent loosening of the bolt. This is a relatively inexpensive embodiment, offering a cost advantage, but it suffers a disadvantage not shared by the other embodiments in that some users may not possess the degree of strength necessary to achieve a substantial degree of tightness.

Figure 10:
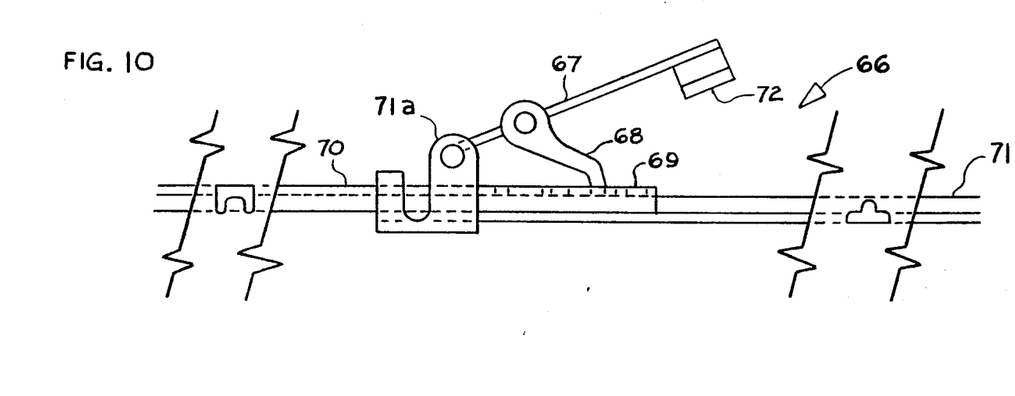
FIG. 10 is a view of a preferred form of ratchet and pawl interconnection means.

In FIG. 10, I depict a ratchet and pawl arrangement 66, with the cross sections of the mating components being complementary and closely interfitting so as to minimize the opportunity for any degree of unwanted relative motion. A handle 67 is pivotally mounted on member 71a, which in turn is welded or otherwise secured upon member 71 of inverted T-shape. The handle 67 is manipulated be the motorist to move the pawl 68 to successively more remote holes 69 disposed in evenly spaced relation in the member 70 of inverted U-shape, so as to draw the connection rods to the desired degree of tightness. A ledge or latching member 72 on the underside of the handle 67 is designed to be brought in contact with the underside of the member 71 when the desired degree of tightness has been achieved. Then, I preferably utilize a captive encircling spring, which is "rolled" over the handle 67 to prevent it from loosening.

Figures 11, 13:
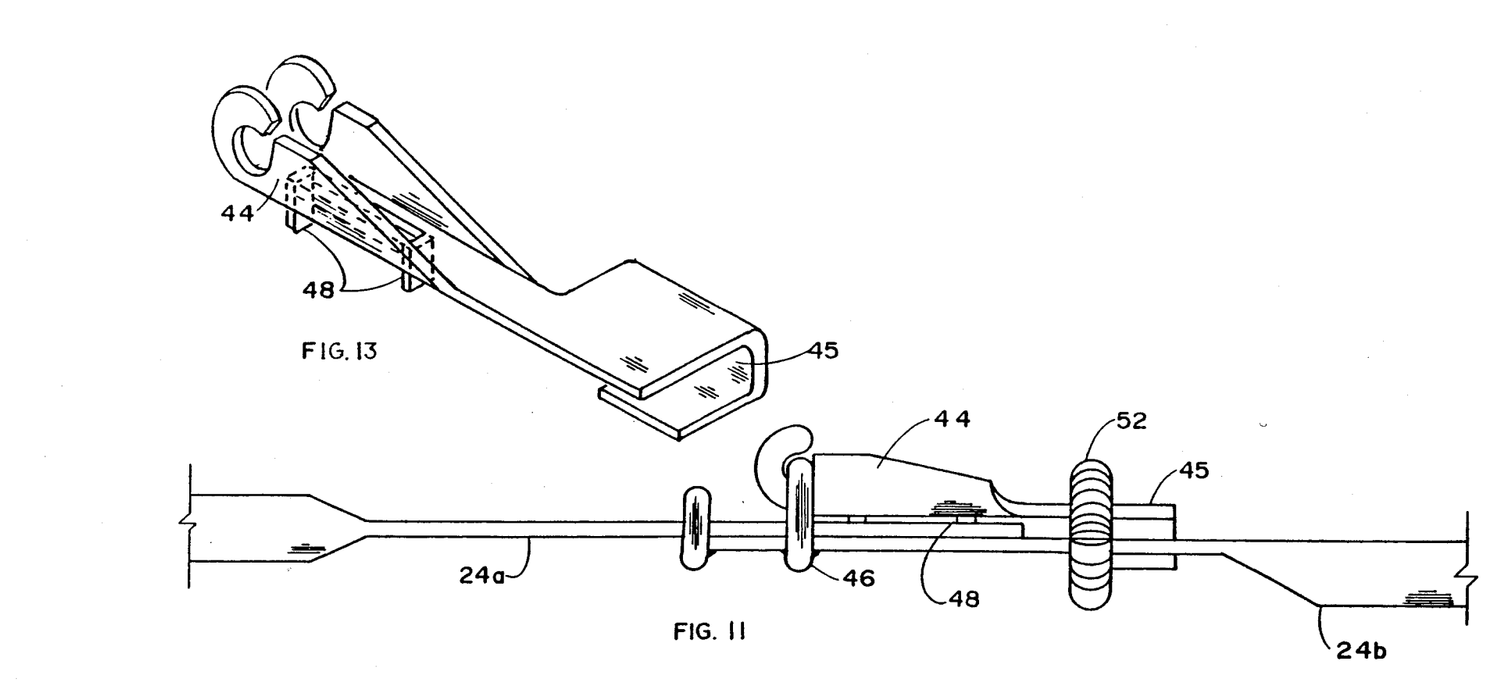
FIGS. 11 to 13 are another form of interconnection means, this being of a latch type.
Figure 12:
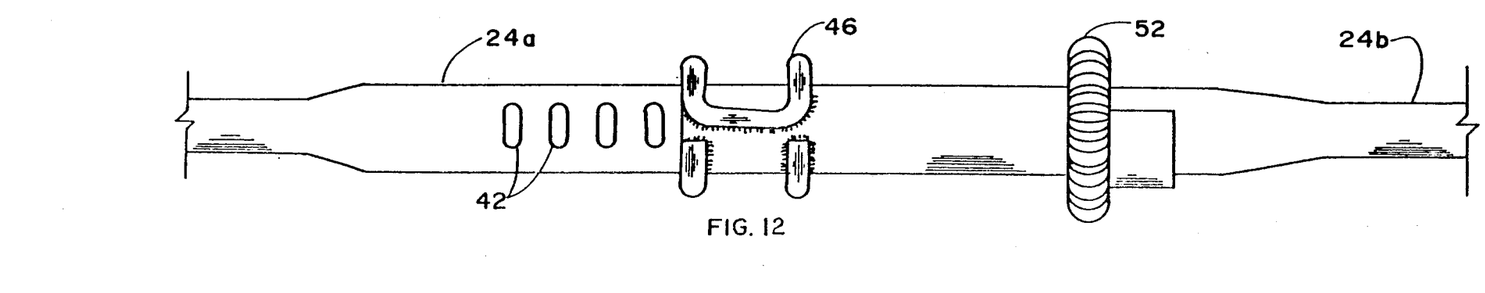

In accordance with the latch type arrangement illustrated in FIGS. 11 and 12, the connection rod portion 24a preferably takes the form of an elongate member designed to be inserted into an internal portion of connection rod member 24b. More particularly, connection rod portion 24a is equipped with a number of spaced holes 42, the spacing of which is consistent. Member 24b utilizes a latching member 44 much in the nature of a pawl, rotatably mounted upon a generally circular member 46, latter member being welded to member 24b. The latching member is equipped with a pair of teeth 48 visible in FIG. 11, and in greater detail in FIG. 13, which are arranged to enter a pair of non-contiguous holes 42 of member 24a at such time as the connecting rod portions 24a and 24b have been drawn together as tightly as possible. The latching member is also equipped with a U-shaped flange 45 that will partially encircle the connection rod member 24b at the time of latching.

As should now be apparent, at such time as the connection rod portion 24a has been moved inside the circular member 46 as tightly as possible, the teeth 48 are caused to engage appropriate holes 42, as a result of rotation of latching member 44 about the circular member 46. At such time as the latching member 44 has been swung to its fully closed position, the the U flange 45 may then be caused to encircle the connecting rod member 24b, providing a very strong and sturdy connection. Accidental release is prevented by the use of an encircling captive spring 52, which is moved over the U flange 45 of the latch member when it is in its locked position.

Figure 14:
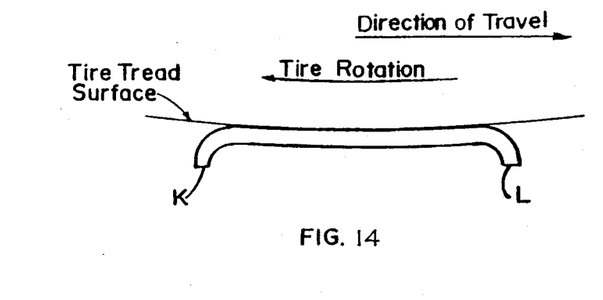
FIGS. 14 and 15 are views of the ground engaging portions of my novel cleat.
Figure 15:
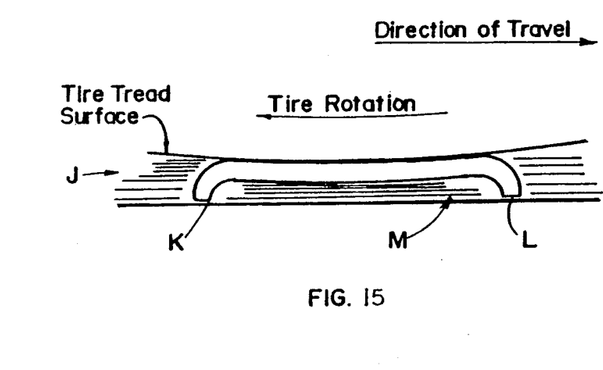

Turning to FIGS. 14 and 15, it is to be realized that the rotation of the automobile tire with the traction device attached causes each cleat of the device in turn to contact the snow or icy surface. As each cleat contacts a snow surface, the snow is compressed into the angle at J formed by the automobile tire tread and one of the anti-skid flanges 16, here designated to be the leading edge flange K of the cleat. In addition, the leading edge flange K and the trailing edge flange L form an area M, approximately trapezoidal, in which snow is trapped and compressed due to the shape of the flanges. As each cleat rotates, the snow is ejected and then again the cleat, at the next contact point with the snow surface, repeats the trapping and compressing of snow.

The compressing of the snow increases the density and shear strength of the snow, thus creating traction points with the snow between the cleat attached to the automobile tire and the snow surface, with the resulting improvement in the vehicular mobility and movement in traversing snowy roads.

The anti-skid flanges designated as flange edges K and L act as contact points, in the event an icy road surface is encountered, by fracturing the icy surface and thereby creating traction points with the icy surface or the underlying road surface. The interruptions or lateral anti-skid notches 38 revealed in FIG. 2 provide additional contact points along the edge of the flanges to minimize the lateral or sideways slippage of the tire in contact with the icy road surface, thus creating a substantial improvement in vehicular safety and mobility.

Although the cleat measurements presented in the tables set forth above relate to the most widely used tires, those of Series 70, 75 and 80, it is obvious that cleats in accordance with my invention could readily be provided for use with Series 50 or 60 tires.

Figure 16:
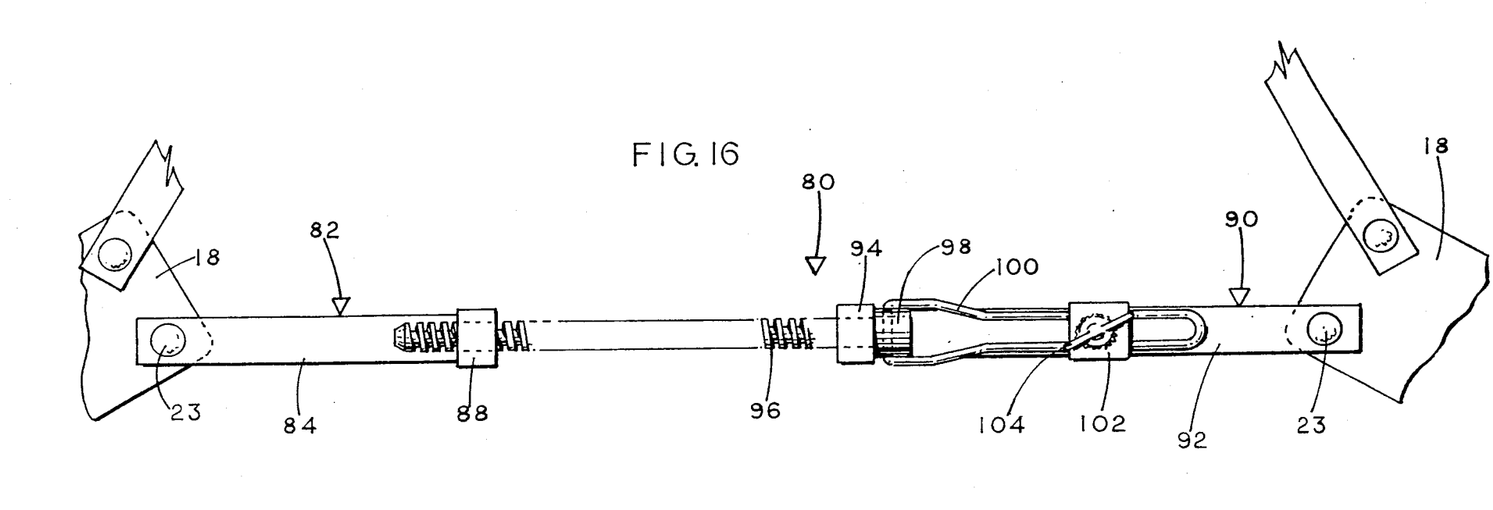
FIG. 16 is a top view of the preferred embodiment of interconnection means used with my anti-skid device, this embodiment being designed to effectively resist twisting.
Figure 17:
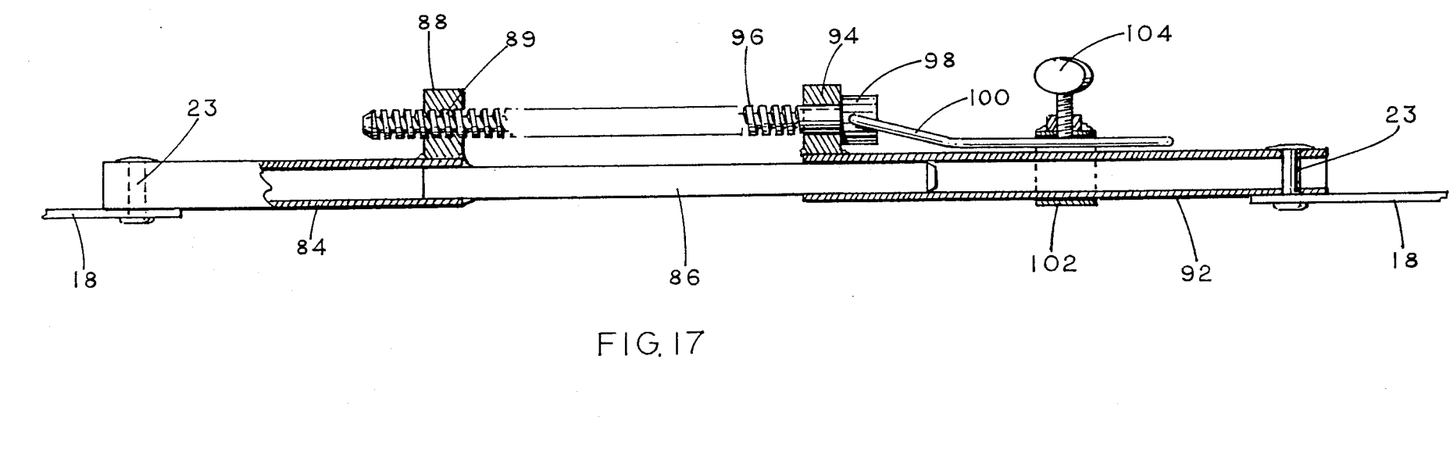
FIG. 17 is a side elevational view of the interconnection means of FIG. 16, showing more details of the integral bolt.
Figure 18:
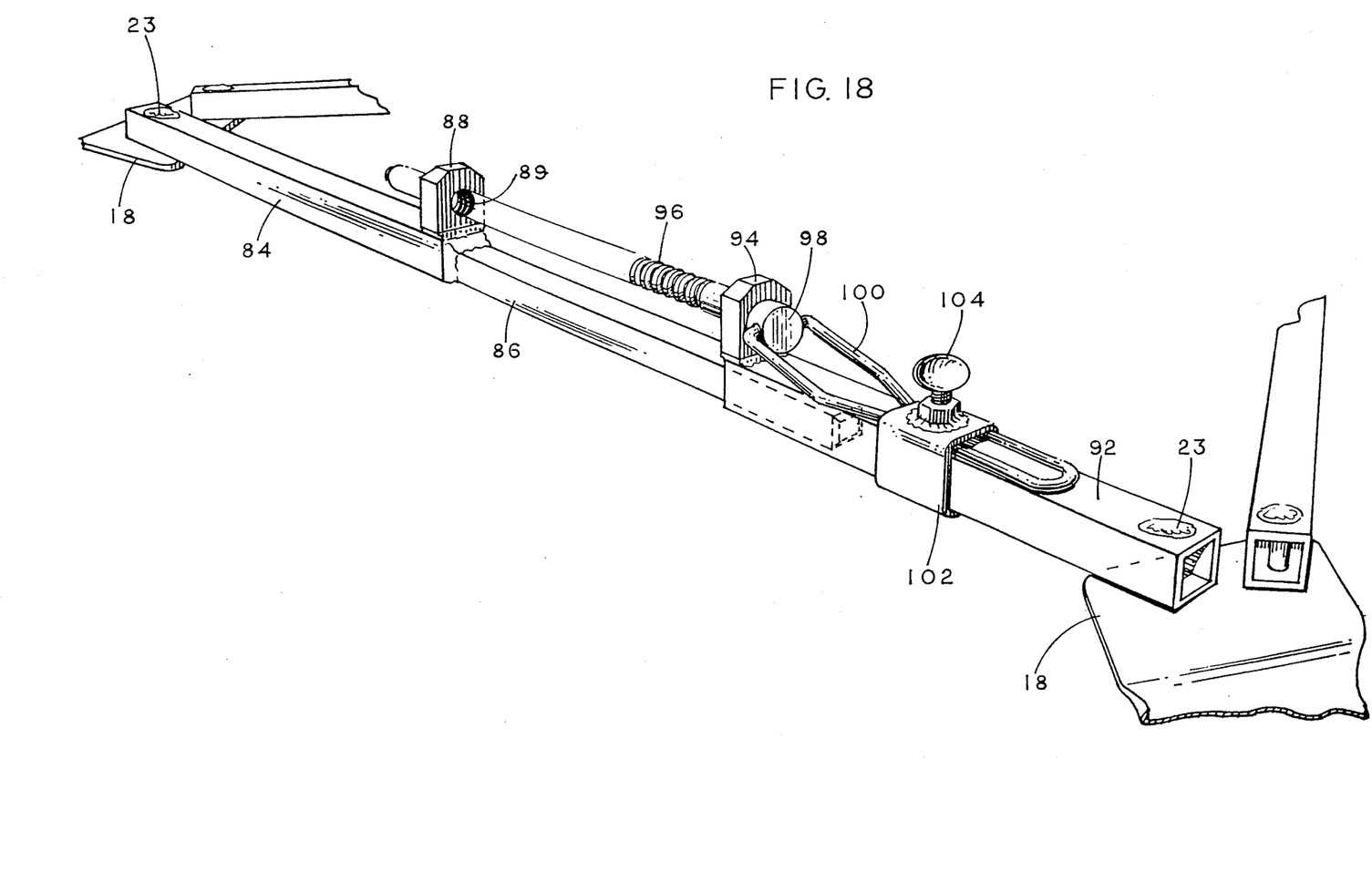
FIG. 18 is a perspective view of the preferred embodiment.

Turning now to FIGS. 16 through 18, it will be seen that I have provided an embodiment 80 usable for installing my novel cleats on the tire of a motor vehicle, and I prefer to refer to this embodiment as a telescoping bar interconnection with integral tightening means. Principally involved in this embodiment is a subassembly 82 involving a section 84 of square tubing of comparatively short length, into the end of which is welded a square bar 86, with this being accomplished in such a manner that the centerline of bar 86 is in effect a continuation of the centerline of the short section 84 of square tubing. The opposite end of the short section 84 of square tubing is of course pinned by the use of an attachment pin 23 to the integral attachment flange 18 of one of my cleats 14.

Welded just above the juncture of bar 86 with tubing 84 is a threaded nut 88, with this nut preferably being provided with an acme thread 89 for receiving a component to be described shortly. The centerline of nut 88 is parallel with and spaced from the common centerline of tubing 84 and bar 86.

Utilized in conjunction with subassembly 82 is a subassembly 90 involving a comparatively short section 92 of square tubing, whose interior is of such dimension as to closely receive the square bar 86 when the user of my device is in the act of assembling my novel tire cleats onto the driving wheel of a motor vehicle.

Welded just above the open end of the short section of tubing 92 is a collar 94, which collar is provided with a central opening in which to rotatively receive a threaded bolt 96, which bolt is threaded throughout its length except at the location inside the collar 94. The bolt 96 serves with the nut 88 as the integral tightening means for my device. A shoulder 98 is provided on one end of bolt 96, which shoulder is of a size such that it will not pass through the central opening of collar 94. As will be obvious from an inspection of FIGS. 16 through 18, the thread provided along the length of the threaded bolt 96 coincides with the thread of the nut, such that it is operatively received in the threaded nut 88, and this thread, as previously mentioned, is preferably an acme thread.

Holes are drilled 180° apart in the shoulder 98, or else a through hole is drilled, being placed so as to receive the free ends of the loop type handle 100. This handle is of heavy wire, as best seen in FIGS. 17 and 18, and the arrangement is such that the handle can be moved to any of a large number of different rotative positions with respect to the bolt 96 during the tightening or loosening of the bolt. The handle 100 is preferably bent as shown in FIG. 17 so as in one rotative position to lie flat against one side of the square tubing 92.

A slip band or hold down clamp 102 is provided as shown in FIGS. 16 through 18, which clamp is of a size and configuration as to enable it to be slipped over the handle 100 in the manner illustrated. FIG. 17 reveals that the clamp 102 is sufficiently larger than the tubing 92 as to permit the clamp to be slid over the handle 100 when the handle has been sufficiently tightened.

A bolt preferably in the nature of a thumb bolt 104 is in effect an integral part of the hold down clamp 102, with the threaded portion of such bolt, when tightened, protruding down into the hollow central portion of the bent wire handle 100. There is no need for the threaded portion of the bolt 104 to be in forcible contact with the tubing section 92, for it is preferred for the slip band 102 to be able to move for an inch or so along the handle 100, even after the bolt 104 has been fully tightened, with its head in firm contact with the threaded nut best seen in FIGS. 17 and 18, that had been welded over a suitable hole in the upper portion of the slip band 102. As is obvious from FIGS. 16 and 18, the loop type configuration of the handle 100 prevents the clamp 102 from sliding completely off of the handle.

When the threaded bolt 96 has engaged the internal thread of nut 88 in the manner shown in FIGS. 16 through 18, the handle 100 may be moved away from the position adjacent the tubing as shown in FIGS. 17 and 18, and then rotated by the person concerned with installing the novel tire cleats in accordance with this invention on a tire of the vehicle. Depending on the direction of handle rotation, the handle 100 is used to cause the bolt 96 to rotate in the tightening direction or the loosening direction with respect to the nut 88. Obviously, the operator must adjust the position of the handle frequently during the bolt loosening or bolt tightening procedure, so as to prevent the deployed handle from hitting the tubing 92.

The bolt 96 is of a length as to permit a substantial extent of tightening action to take place before the end of square tubing 92 comes into contact with the end of square tubing 84. As will be understood, square bar 86 is of a length such that it does not quite contact the attachment pin 23 securing the tubing section 92 to the tire cleat attachment flange fragment 18 shown in FIGS. 16 through 18.

With reference again to my novel cleats 14, it should now be clear that the interior flange 34 coupled with the integral attachment flange 18 react as a type of spring with the sidewalls of the tire, compensating not only for the slight variations in tire dimensions due to tire wear and manufacturer's tolerances, but also for tire sidewall expansion when the tire is in contact with the roadway surface.

In FIG. 5 it was earlier pointed out that the cleats 14 are to be seen to be in a tire griping relationship as a result of the latching of the interconnection or attachment means 26, which causes the type of spring action inherent in my advantageous design to be brought about. In other words, at such time as the interconnection means have been drawn together and properly fastened, the inner surface 28 as well as the inner surfaces of members 18 and 34 of the cleats are brought into gripping contact with the tread 21 and inboard and outboard portions of the sidewalls of the tire 20, and therefore the road-contacting surface 30 of each cleat becomes essentially parallel with the tire tread 21. In addition to referring to the connection rods as forming a fixed framework 13, I prefer to designate the plane of connection rods 22 as a tension plane 32, which is parallel to the plane of the wheel and tire, and located closely adjacent what may be regarded as the outer sidewall of the tire 20.

Although in most instances, I prefer for the integral attachment flange 18 to form approximately an 85° angle with the inner portion 28 and the outer, road contacting portion 30 of the cleat, the angle could be as small as 70° to 75°, or as large as 88°. Stating the same thing in a different manner, the integral attachment flange normally bears a 5° angle to a perpendicular to the inner surface 28 of the cleat, as depicted in FIG. 3, but it some instances it could bear a 15° to 20° angle to the plane of framework 13, or as small an angle as 2°.

Therefore it is to be seen that the configuration of my novel cleat members is such as to bring about a novel form of "spring" action, with the consequence that my novel anti-skid cleat members grip the tire 20 very tightly, preventing any form of undesirable movement of my anti-skid device with respect to the tread of the tire, even while the automobile or other vehicle is underway at proper road speeds.

The novel tension plane or rigid framework 13 created in the connection rods at the time of tightening the interconnection means amounts to the highly effective combination of light weight with considerable inward force, with all flexure in the arrangement being confined to the outer portions of the framework 13, involving the integral attachment flanges 18 of the novel cleats 14. This inward force causes the cleats to be held tightly against the tread and outboard portions of the sidewalls of the tire, with this novel configuration advantageously leaving the central hub area clear.

Except possibly for the embodiment in accordance with FIGS. 9a and 9b, my novel anti-skid device is of such construction that a person not possessing great strength can readily install same, such as a youth or a woman.

My highly advantageous device differs from all other anti-skid devices for road vehicles of which I am aware, in that none of the connection rods I use extend radially from a given cleat toward the wheel hub, but rather each connection rod reposes at an angle to an imaginary radial line extending between a given cleat, and the hub portion of the wheel. The angle each connection rod attached to a given cleat of a three cleat embodiment bears to that imaginary radial line is approximately 30°, with the angle between adjacent rods connected to that cleat being approximately 60°.

I claim:

1. An anti-skid device for ready application to the tire of a driven vehicle wheel in order to improve its traction, said device being entirely installable from the outer or hub side of the wheel, with access to the backside of the tire or the underside of the vehicle being unnecessary, either during installation or removal, said device comprising a rigid framework adapted to be placed parallel to the plane of the tire and located against the outer sidewall of the tire, said framework being constituted by a plurality of rigid components having outer portions located radially inwardly of the tread portion of the tire, at least three curved cleats each having an inner surface, an outer road contacting surfaces, and a bent integral attachment flange, with the integral attachment flanges of said cleats being attached at approximately evenly spaced locations around the periphery of said framework, with the inner surface of each of said cleats being designed to a curve in a cantilever manner around the tread of the tire, the relationship of each integral attachment flange to the inner surface of the respective cleat being such that the each inner surface normally bends toward the axis of rotation of the vehicle wheel and has less than a 90° angle with respect to the plane of said framework, the bend in said integral attachment flanges being overcome at the time said device is tightly installed on the tire, thus to create a form of spring serving to overcome any trend toward the development of slack due to deformation of the portion of the tire in contact with the ground at a given cleat location.

2. The anti-skid device as defined in claim 1 in which said rigid framework is made up of a plurality of connection rods, with one of such rods forming a connecting and tightening means, such that the inner surfaces of said cleats may be drawn to a selected degree of tightness against the tread of the tire by the user.

3. The anti-skid device as recited in claim 2 in which said connection rods define, at the time of fastening said connecting and tightening means, a tension plane serving to hold said cleats tightly against the tread of the tire, while at the same time avoiding interference with the hub cap of the wheel.

4. The anti-skid device as recited in claim 2 in which in conjunction with said tightening means, a telescoping bar interconnection with integral tightening bolt is utilized.

5. An anti-skid device for ready application to the tire of a driven vehicle wheel in order to improve its traction, said device being entirely installable from the outer or hub side of the wheel, with access to the backside of the tire or the underside of the vehicle being unnecessary, either during installation or removal, said device comprising a rigid framework adapted to be placed parallel to the plane of the tire and located against the outer sidewall of the tire, said framework being constituted by a plurality of rigid components having outer portions located radially inwardly of the tread portion of the tire, at least three curved cleats each having an inner surface, an outer road contacting surface, and an integral attachment flange, with the integral attachment flanges of said cleats being attached at approximately evenly spaced locations around the periphery of said framework, with the inner surface of each of said cleats being designed to curve in a cantilever manner around the tread of the tire, the relationship of each integral attachment flange to the inner surface of the respective cleat being such that each inner surface normally bends toward the axis of rotation of the vehicle wheel and has less than a 90° angle with respect to the plane of said framework, said anti-skid device having an attachment mode in which said inner surfaces of said cleats are initially placed in light contact with the tread of the tire, and an operating mode in which the tread contacting inner surfaces of said cleats are drawn into tight gripping contact with the tire tread, and at the same time overcoming the normal bent condition of said cleats, thus to form a spring loaded condition such that when said framework has been placed in its operating mode, the angularity of said inner surfaces of said cleats with respect to the plane of said framework is brought to approximately a right angle as a result of their tight gripping of the tire tread.

6. The anti skid device as defined in claim 5 in which said rigid framework is made up of a plurality of connection rods, with one of such rods forming a connecting and tightening means, such that the inner surfaces of said cleats may be drawn to a selected degree of tightness against the tread of the tire by the user.

7. The anti-skid device as recited in claim 6 in which said connection rods define, at the time of fastening said connection and tightening means, a tension plane serving to hold said cleats tightly against the tread of the tire, while at the same time avoiding interference with the hub cap of the wheel.

8. The anti-skid device as recited in claim 6 in which three connection rods are utilized, each reposing at an angle to an imaginary radial line that would extend between a given cleat and the hub portion of the wheel, such angle each connection rod makes to the imaginary radial line being approximately 30°, and the angle between adjacent rods being approximately 60°.

9. The anti-skid device as recited in claim 6 in which no vertical vector directed toward the hub area of the wheel is present, and all forces created in an approximate vertical direction by each successive cleat coming in contact with the ground are resolved through said connection rods forming at least a 30° angle to the vertical, with the inherent spring action of this arrangement enabling the device to automatically compensate for the foreshortening of the distance between the tread in contact with the ground, and the center of rotation of the wheel.

10. The anti-skid device as recited in claim 6 in which said connection rods together form an essentially rigid framework, at the corners of which framework said cleats are pivotally affixed, the connection in each instance between each corner of the framework and the cleats being such as to permit flexure in the sense of a spring of those cleats not at a given moment in contact with the ground, and the portion of the tire tread with which those out-of-contact cleats are in contact.

11. The anti-skid device as recited in claim 6 in which a total of three cleats and three connection rods are utilized.

12. The anti-skid device as recited in claim 6 in which a total of four cleats and four connection rods are utilized.

13. The anti-skid device as recited in claim 6 in which more than four cleats, and an equal number of connection rods are utilized.

14. The anti-skid device as recited in claim 6 in which said cleats are of hardened metal, and upstanding anti-skid flanges and interruptions are formed on said outer surface of each of said cleats, said flanges and interruptions extending along either side of the cleat, in a direction across the tread of the tire.

15. The anti-skid device as recited in claim 6 in which said connection and tightening means takes the form of a ratchet and pawl.

16. The anti-skid device as recited in claim 6 in which said connection and tightening means takes the form of a turnbuckle.

17. The anti-skid device as recited in claim 6 in which in conjunction with said tightening means, a telescoping bar interconnection with integral tightening bolt and handle is utilized.

18. The anti-skid device as recited in claim 6 in which said integral attachment flange of each cleat is bent at an angle to said outer surface of the cleat, said angle being less than 90°.

19. The anti-skid device as recited in claim 18 in which the angular relationship between said cleats and their respective attachment flanges results in the cleats standing away from the tire tread until such time as said connecting and tightening means has been tightened and fastened.

20. The anti-skid device as recited in claim 19 in which said connecting and tightening means takes the form of a clasp.

21. The anti-skid device as defined in claim 6 in which said connection rods connect to the integral attachment flange of each cleat by means of independent pivot points passing through the integral attachment flange.

22. The anti-skid device as defined in claim 6 in which each adjacent pair of interconnecting elongate connection rods connect to the integral attachment flange of each cleat by means of a single pivot point passing through the integral attachment flange.

23. The anti-skid device as defined in claim 14 in which said upstanding anti-skid flanges create a cavity of approximately trapezoid configuration in which the snow can be compacted in the interests of increased traction.

24. An anti-skid device for ready application to the tire of a vehicle wheel in order to improve its traction, said device being entirely installable from the outer or hub side of the wheel, with access to the backside of the tire or the underside of the vehicle being unnecessary, either during installation or removal, said device comprising at least three curved cleats, each having an inner surface and an outer surface, and each also having an integral attachment flange, each cleat being configured and designed to curve in a cantilever manner around the tread of the tire, said cleats being interconnected by a number of elongate connection rods, with there being as many connection rods as there are cleats, with each end of each of such connection rods being pivotally affixed to the integral attachment flange of a cleat, such that substantially more than half of the periphery of the tire is encompassed when said cleats are arrayed in an approximately equally spaced relation in contact with the tread of the tire, one of said connection rods being in two pieces, with each such piece connected to an attachment flange, and including interconnection means such that said two pieces may be drawn tightly together and fastened in a manner to create a connection rod approximately the same length as the other connection rods, with the inner surface of each of said cleats being brought into tight contact with the tread of the tire at the time of the fastening of said interconnection means, with the connection rods thus forming a multicornered, essentially rigid framework, the pivotal connection between each corner of said framework and the respective cleat being such as to forbid any flexure in the framework, but to permit substantial cleat flexure with respect to the framework, in the sense of a spring, of those out-of-ground-contact cleats.

25. An anti-skid device for ready application to the tire of a vehicle wheel to improve its traction, said device being entirely installable from the outer or hub side of the wheel, with access to the backside of the tire or the underside of the vehicle being unnecessary, either during installation or removal, said device comprising at least three curved cleats, each having an inner surface and an outer surface, and each also having an integral attachment flange, each cleat being configured and designed to curve in a cantilever manner around the tread of the tire, with the inner surface of the cleat disposed adjacent the tread of the tire, so that it can be caused to clasp same, said cleats being interconnected by a number of elongate connection rods, with there being as many connection rods as there are cleats, all but one of said connection rods being of fixed length, with each end of such rods being pivotally affixed to the integral attachment flange of a cleat, thus forming an elongate assembly that can be placed around a tire, to encompass substantially more than half of the periphery of the wheel when said cleats are arrayed in an approximately equally spaced relation, in contact with the tread of the tire, the remaining connection rod being in two pieces, with each piece connected to an attachment flange, and including interconnection means such that the two pieces may be drawn tightly together and fastened in a manner to create a connection rod approximately the same length as the other connection rods, thus to complete the establishment of the assembly in surrounding relation around the tire, with the inner surface of each of said cleats being brought into tight contact with the tread of the tire at the time of the fastening of said interconnection means.

26. The anti-skid device as recited in claim 25 in which said connection rods define, at the time of fastening said interconnection means, a tension plane serving to hold said cleats tightly against the tread of the tire, while at the same time avoiding interference with the hub cap of the wheel.

27. The anti-skid device as recited in claim 25 in which a total of three cleats and three connection rods are utilized.

28. The anti-skid device as recited in claim 25 in which a total of four cleats and four connection rods are utilized.

29. The anti-skid device as recited in claim 25 in which more than four cleats, and an equal number of connection rods are utilized.

30. The anti-skid device as recited in claim 25 in which said cleats are of hardened metal, and upstanding anti-skid flanges and interruptions are formed on said outer surface of each of said cleats, said flanges and interruptions extending along either side of the cleat, in a direction across the tread of the tire.

31. The anti-skid device as recited in claim 25 in which said interconnection means takes the form of a ratchet & pawl.

32. The anti-skid device as recited in claim 25 in which said interconnection means takes the form of a turnbuckle.

33. The anti-skid device as recited in claim 25 in which in conjunction with said interconnection means, a telescoping bar interconnection with integral tightening bolt and handle is utilized.

34. The anti-skid device as recited in claim 25 in which said integral attachment flange of each cleat is disposed at an angle to the approximate midpoint of the outer, road contacting surface of the cleat, said angle being less than 90°.

35. The anti-skid device as recited in claim 25 in which the angular relationship between said cleats and their respective attachment flanges results in the cleats standing away from the tire tread until such time as said interconnection means has been tightened and fastened.

36. The anti-skid device as recited in claim 25 in which said interconnection means takes the form of a clasp.

37. The anti-skid device as defined in claim 25 in which said interconnecting elongate connection rods connect to the integral attachment flange of each cleat by means of independent pivot points passing through the integral attachment flange.

38. The anti-skid device as defined in claim 25 in which each adjacent pair of interconnecting elongate connection rods connect to the integral attachment flange of each cleat by means of a single pivot point passing through the integral attachment flange.

39. The anti-skid device as defined in claim 25 in which said upstanding anti-skid flanges create a cavity of approximately trapezoid configuration in which the snow can be compacted in the interests of increased traction.

* * * * *